United States Patent [19]

Fuchs et al.

[11] Patent Number: 4,521,311

[45] Date of Patent: Jun. 4, 1985

[54] ACTIVATED SLUDGE SYSTEM WITH INTEGRATED REGENERATOR

[75] Inventors: Uwe Fuchs, Munich; Alfred Wildmoser, Haar, both of Fed. Rep. of Germany

[73] Assignee: Linde Aktiengesellschaft, Wiesbaden, Fed. Rep. of Germany

[21] Appl. No.: 518,712

[22] Filed: Jul. 29, 1983

[30] Foreign Application Priority Data

Jul. 29, 1982 [DE] Fed. Rep. of Germany ....... 3228365

[51] Int. Cl.³ .......................... C02F 3/06; C02F 3/08
[52] U.S. Cl. .................................. 210/616; 210/618; 210/151
[58] Field of Search ............... 210/150, 151, 617, 618, 210/616

[56] References Cited

U.S. PATENT DOCUMENTS

| | | | |
|---|---|---|---|
| 2,071,591 | 2/1937 | Tholin | 210/616 |
| 3,232,434 | 2/1966 | Albersmeyer | 210/151 |
| 3,956,128 | 5/1976 | Turner | 210/150 |
| 3,968,034 | 7/1976 | Tymoszczuk | 210/618 |
| 4,055,490 | 10/1977 | Hasegawa et al. | 210/151 |
| 4,137,171 | 1/1979 | Yokata | 210/150 |
| 4,391,703 | 7/1983 | Crosby | 210/151 |

FOREIGN PATENT DOCUMENTS

| | | | |
|---|---|---|---|
| 0025309 | 3/1981 | European Pat. Off. | |
| 0046901 | 3/1982 | European Pat. Off. | 617/ |
| 100691 | 8/1981 | Japan | 210/617 |
| 2053882 | 2/1981 | United Kingdom | 210/618 |

Primary Examiner—Benoît Castel
Attorney, Agent, or Firm—Millen & White

[57] ABSTRACT

In the treatment of wastewater, the mixture of wastewater and the sludge is transported through a treatment zone, and then through a filter zone containing a bed of support particles, e.g., particles of polyurethane foam, to deposit the biomass onto the support particles. The loaded support particles are subsequently regenerated within the filter zone by means of a regenerating means in the same area as the filter zone, e.g., by strong aeration or by being compressed between press-rolls, whereby the system requires neither additional land for regeneration of the support particles nor a secondary settling tank.

18 Claims, 3 Drawing Figures

ACTIVATED SLUDGE SYSTEM WITH INTEGRATED REGENERATOR

BACKGROUND OF THE INVENTION

This invention relates to an activated sludge system, i.e. to the biological purification of wastewater, e.g., sewage, wherein the wastewater is treated in a reactor in the presence of sludge, optionally with the absorption of air and/or oxygen, and subsequently the mixture of treated wastewater and activated sludge is separated into purified water and sludge.

In conventional biological wastewater treatment processes, such as activation, nitrification or denitrification processes, it is necessary to separate in a downstream secondary settling tank the purified wastewater from the biomass formed by the activity of special microorganisms suspended in the wastewater as well as in the solids contained in the incoming wastewater as well as in the solids contained in the incoming wastewater. Even in the more recent wastewater treatment processes, in which the microorganisms responsible for the biological conversion are fixed on support materials, such as for example, sand, activated charcoal or polymeric foam particles, it is necessary to include a secondary settler and/or a regenerating installation for the support particles; otherwise, upon the design load being occasionally exceeded, an undesirable formation of unfixed biomass would occur, thereby detrimentally affecting the quality of the purified wastewater effluent. The installation of a downstream secondary sedimentation tank or regenerator for the support particles is, however, expensive and requires additional land, which in the case of wastewater purification is not an insignificant factor in view of the huge equipment sizes involved. In one attempt to solve this problem, a cyclically operated compressor chamber is suggested for regeneration, U.S. patent application Ser. No. 467,007, filed Feb. 16, 1983 by Uwe Fuchs, one of the co-inventors of this invention, said application being incorporated by reference herein; nevertheless, this suggested solution to the problem is less than ideal for activated sludge systems.

SUMMARY

It is thus an object of this invention to provide an improved process of the aforementioned type, together with associated apparatus, whereby a substantially complete separation of the purified wastewater and the sludge is obtained in a simple and economical manner.

Upon further study of the specification and appended claims, further objects and advantages of this invention will become apparent to those skilled in the art.

These objects are attained by providing a system comprising conducting the mixture of wastewater and activated sludge downstream of the treatment zone through a filter zone containing a bed of support particles; depositing biomass and solids from said mixture into the support particles; regenerating resultant loaded support particles within the general area of the filter zone; and withdrawing resultant purified wastewater and said biomass solids removed from the support particles from the filter zone in separate streams.

According to a preferred aspect of the invention, the filter zone and the treatment zone are contained within a single housing, e.g. the filter zone is contained within the activation basin. The creation of a filter zone containing support particles in the treatment zone reactor permits: (a) the separation of the solids present in the incoming wastewater; (b) the separation of the purified wastewater; and (c) the separation of the sludge, all taking place in the same reactor, i.e. without the necessity of a secondary settling tank. In the process, the solids and the biomass are deposited in part on the empty support particles and in part retained in the interstices of the support particles. When the filter zone becomes loaded with solids and biomass, the support particles are regenerated within the filter zone. Moreover, the regeneration may be effected continuously, as will be shown hereinbelow. The biomass obtained during the regeneration of the support particles may be removed as excess sludge or returned at least in part to the reactor as recycle sludge. It is possible thereby to entirely eliminate secondary settling following the reactor, or else, to relieve the secondary settler facility in the case of overload so as to continue to obtain a separation of purified water and sludge that is as complete as possible.

Preferably, the filter zone is maintained during normal operation as free of turbulence as possible. The proportion by volume of the support particles with respect to the volume of the filter zone is set at 40 to 80%, preferably 60 to 70%. In this manner, the disruption of the filter zone and the formation of large voids, e.g., over 5 mm in the filter bed are prevented; this would otherwise have a detrimental effect on the filter process. To achieve such flows in the filter bed which are of insufficient turbulence to disrupt the filter bed, it is preferred that space velocity of the liquid stream (assuming the influent to the filter bed to be 100% liquid and volume of filter bed to be devoid of support particles) is 0.03 to 1.2, preferably especially about 0.08 to 0.3 cm/sec. The higher the content of solids present in the wastewater, the lower must be the velocity of the liquid stream and the higher must be the intensity of the regeneration of the support particles. This may be reached in the case of a discontinuous regeneration by a high regeneration frequency or in the case of a continuous regeneration by a high mass flow of support particles to the regeneration unit.

The treatment zone of the reactor is operated advantageously as a fully mixed activation basin, optionally containing support particles for growth of the biomass, or as a column reactor definitely containing support particles for growth of the biomass. In general, the proportion by volume of the support particles in the treatment zone is set at 20 to 60%, as a function of the type of reactor used. In the case of a fully mixed activation basin the proportion by volume of the support particles is preferably 20 to 40%, and in a column reactor preferably 40 to 60%, of the total volume of the treatment zone. The choice of the appropriate type of reactor generally depends on the initial load of the wastewater. In particular, in the case of highly loaded wastewater, it is convenient to provide the reactor in the form of a column reactor, while with less loaded wastewater the employment of a fully mixed activation basin is adequate. Similarly, it is advisable to operate the reactor in the form of a column reactor to effect nitrification or denitrification processes. By highly loaded wastewater is meant a wastewater with BOD-contents greater than 1000 mg/l, COD-contents greater than 1500 mg/l and contents of suspended solids greater than 10 kg/m$^3$.

Preferably and advantageously, both in the treatment zone and in the filter zone of the reactor, flexible, open cell, porous organic polymers are used as the support particles. In particular, polyurethane foam or foamed rubber or similar materials with open macropores, as provided by industry for other conventional uses, e.g., cushioning, mattresses, etc., are suitable as support materials, with the advantage that inexpensive industrial remnants or waste items may be employed. The size of the individual support particles may vary between 0.5 and 50 mm, preferably 10 to 20 mm. These ranges of dimensions of the support particles assure stable bacterial accumulations, together with the supply of oxygen and the transport of material to the interior of the support particles. If the reactor is used for the conversion of carbon compounds or as a nitrification reactor, by means of the selection of the support particles within the upper range of the values given, anoxic zones may be created inside the support particles, so that in the treatment zone of the reactor, aside from the decomposition of the carbon compounds and nitrification, denitrification processes may also be effected. However, such denitrification processes may obviously also be located in the filter zone. In principle, other supports known in the prior art can also be employed in this invention, especially in the column reactor, but such other materials do not have the advantages of the polyurethane foam. For additional details of the polyurethane foams, reference is invited to U.S. Pat. No. 4,162,216.

In addition to the filtering and precipitating function in the filtering zone, it is also possible to effect residual biological decomposition in the filter zone by aerating the filter zone slightly in normal operation. However, the aeration should generate as little turbulence as possible in the filter zone, in order to avoid the disruption of the filter bed as discussed above. Preferably the space velocity of the gas through the filter bed is maintained at about 0.2 to 3, preferably 0.5 to 1.5. m$^3$ gas (normal condition) per m$^3$ filter bed and hour.

According to a further aspect of an embodiment of the process, it is advantageous to maintain a continuous loading and regenerating process of the support particles. It is especially desirable to provide in the filter zone an upwardly directed flow of the mixture of wastewater and activated sludge and a downward migration of the support particles, and to transport the support particles for regeneration from the lower part of the filter zone, e.g. the bottom 2–20%, and possibly from the lower part of the treatment zone, to above the filter zone, in order to free the support particles of the biomass by compression and to return the support particles free of the biomass to the filter zone and possibly to the treatment zone. The downward flow of the partially empty and thus floating support particles is obtained by the weight of a pile of regenerated support particles protruding from the water. The biomass and solids freed by the compression of the support particles are collected and drawn off the system as excess sludge and/or returned to the treatment zone as recycle sludge.

The return of the recycle sludge may be eliminated, if the regeneration of the support particles, recycled for example through the wastewater inlet into the treatment zone is effected only to the extent that in the course of the compression of the support particles sufficient biomass remains in the pores of the support particles. This may be accomplished, for example, during certain intervals in the process, by conducting the compression of the support particles only to a predetermined extent of their original dimensions, e.g., 20 to 40% of original volume of the particle, and that the support particles regenerated in this manner are added to the wastewater feed, while the support particles compressed to greatest possible extent, e.g., less than 10%, preferably less than 7%, are returned to the filter zone, where they exercise a high filtering effect.

Both to support the regenerating process by means of the compression of the support particles and for the regeneration of the support particles without compression, it is further possible to effect vigorous aeration periodically in the filter zone. By means of the vigorous aeration process, the support particles are churned together in the filter zone. The result is that the solids accumulated between the support particles and the biomass adhering to the support particles are released by gas velocities of at least about 10 Nm$^3$/m$^3$ filter bed$\times$h.

If regeneration is performed without the subsequent compression of the support particles and only by an increased aeration in the filter zone, it is convenient to remove the biomass stripped from the support particles by the strong aeration, by means of the inflowing mixture of wastewater and activated sludge and/or an at least partial rapid emptying of the filter zone, from said filter zone. The biomass removed from the support particles and discharged from the filter zone may be transported to the primary settling tank or to a thickener.

The different possible modes of regeneration—by only the compression of the support particles or by strong aeration of the filter zone with subsequent compression of the support particles, or by vigorous aeration alone—are not restricted to certain types of reactor and may be employed, e.g., as a fully mixed basin with a filter zone, or in a column reactor with a filter zone.

The apparatus for the embodiment of the process comprises a reactor and separating means for purified wastewater and sludge. According to the invention, the reactor comprises a treatment zone, and the separating means for the deposit of the biomass from the treated wastewater comprises a filter zone containing support particles. Regenerating means for the support particles is associated with the filter zone, an activated sludge outlet, and optionally means to recycle the support particles freed of the biomass.

The sludge outlet may be equipped with a sludge return line to the treatment zone and a discharge line for excess sludge. The return line for the support particles freed of the biomass may be connected, in addition to the filter zone, also with the treatment zone, so that regenerated support particles may be returned to the filter zone and also to the treatment zone.

In view of both the effecting of the residual decomposition of organic impurities in the filter zone and of the regeneration of the support particles in the filter zone, it is appropriate to provide aeration means not only in the treatment zone, but also in the filter zone. For residual decomposition, only slight aeration may be effected without causing turbulence in the filter zone, and then vigorous aeration can be used intermittently to obtain churning of the support particles for regeneration.

Depending on the contaminant load of the wastewater, the treatment zone may be in the form of a column reactor or in the form of a fully mixed activating basin, with support particles for the biomass being optionally present in the basin.

To assure the satisfactory operation of the filter zone, the volume of the filter zone should appropriately amount to about ¼ to ⅓ of the volume of the treatment zone.

According to an advantageous aspect of an embodiment of the apparatus of the invention, the regenerating installation for the support particles is equipped with (a) conveyor means connected with the filter zone and optionally also with the treatment zone, (b) drainage means, (c) compressing means, and (d) collecting means for the biomass released. The conveying means may advantageously comprise an air lift pump and the compressing device may comprise at least two rotating press-rolls, with the lower press-roll being preferably porous and associated with the collecting device.

DETAILED DESCRIPTION

Figure 1:
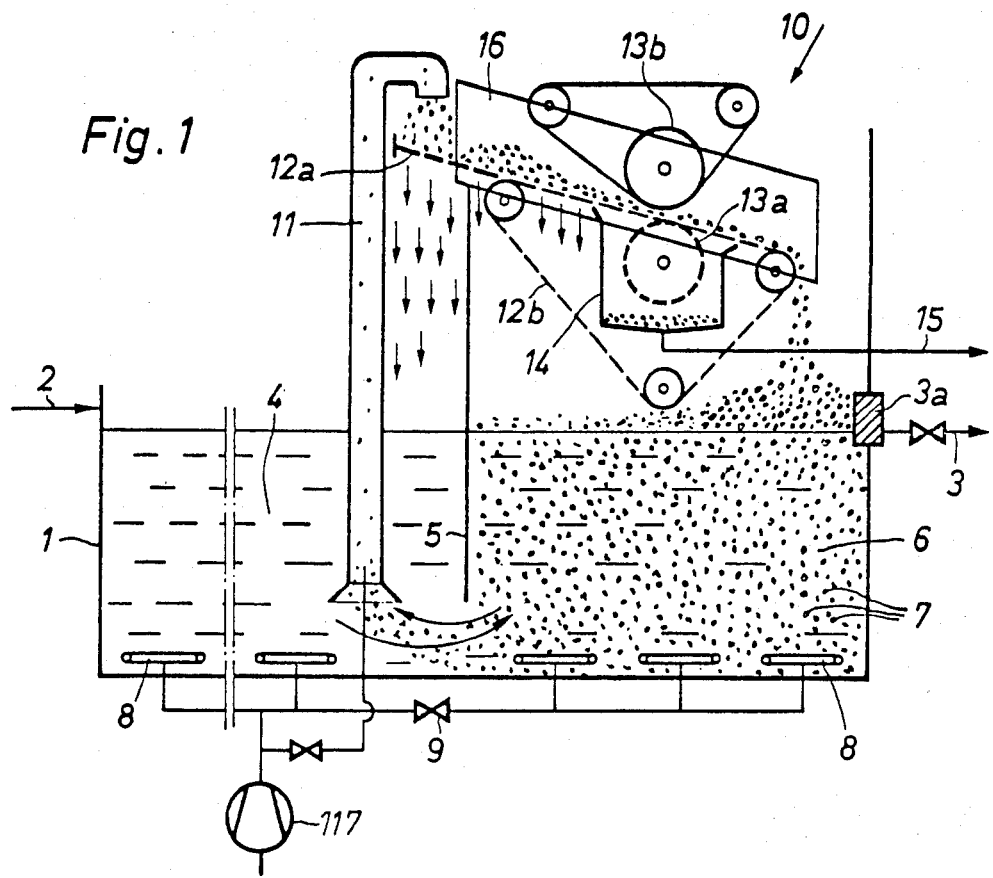
FIG. 1 is a schematic illustration of a preferred embodiment of the invention comprising a substantially, if not completely, mixed activating basin with an integrated filter zone and a regenerating installation.

In FIG. 1, the symbol 1 designates a mixed activating basin for the biological treatment of wastewater, said basin being provided with an inlet 2 for the wastewater to be treated and an outlet 3 arranged at the upper edge of the basin for the treated wastewater. This basin is generally rectangular, but other geometric shapes can also be employed. Within the activating basin 1, a treatment zone 4 is separated by a baffle from a filter zone 6, the latter occupying approximately ¼ of the total volume. Between the bottom of the basin and the bottom of the baffle exists a space the opening of which is in the range of about 10 to 20% of the height of the basin.

In the filter zone 6, tightly packed, porous support particles 7, preferably of a porous, open cell, porous polyurethane foam are present as the filter medium for solids and the biomass, in a volume such that 40 to 80%, preferably 60 to 70%, of the volume of the filter zone 6 are filled with support particles. To prevent the decanting of the support particles through the discharge outlet 3, a screen or grating 3a, having openings of a diameter less than the support particles, is arranged in the outlet 3. To increase the biomass concentration in the treatment zone 4, support particles for the biomass may also be arranged in this zone in amounts corresponding to a volume proportion of the treatment zone of 20 to 40%, preferably 25 to 30%. Furthermore, both in the treatment zone 4 and in the filter zone 6, aeration devices 8 are provided, whereby air and/or oxygen may be introduced. Aeration in the filter zone 6 is not absolutely necessary, but is convenient for the residual decomposition of organic compounds. For this purpose, aeration in the filter zone 6 should be such that insufficient turbulence occurs to disrupt the filter bed. The feed line to the aeration installations 8 of the filter zone 6 is equipped with a control valve 9 for this purpose. The aeration installations 8 themselves are designed so that aeration with medium to coarse bubbles will be possible, e.g., a bubble size in the range of about 5 to 20 mm. In the case of large volumetric flows of the gas, such as those potentially required for the regeneration of support particles, such aeration devices are operated in a more economical manner than with devices providing finer bubbles. Furthermore, they are substantially free of the need for maintenance, as they do not clog easily. A suitable aeration device which will be essentially non-clogable can consist of a hollow body having a gas supply pipe and a perforated top plate. The diameter of the holes in the top plate can be in the range of about 2–7 mm.

For the regeneration of the support particles 7, a regenerating apparatus 10 is arranged above the filter zone 6, said regenerating apparatus comprising conveying means 11, drainage means 12a and 12b, compression means 13a and 13b, and collecting means 14 for the biomass liberated from the supports. The conveying means 11 may comprise, for example, an air lift pump powered by compressor 17 or may be in the form of a pan or chain conveyor, and is located in the treatment zone 4, in the vicinity of the baffle 5 separating the treatment zone 4 from the filter zone 6. By virtue of this arrangement of the conveyor 11, support particles 7 may be transported from the filter zone 6 and potentially also from the treatment zone 4, to the regenerating apparatus 10, where the support particles 7 are suctioned from the filter zone 6 through the gap orifice formed between the bottom of the activating basin 1 and the baffle 5, by the conveyor means 11. At the upper end of the conveyor means 11, the support particles then drop initially onto a perforated chute 12a serving as a preliminary drainage zone and being arranged upstream and above the baffle 5, so that the water flows predominantly into the treatment zone 4. At the outlet of the chute 12a, a revolving, porous conveyor belt 12b is arranged to serve as a secondary drainage zone and for transporting the support particles to the compression device which comprises two press-rolls 13a and 13b, rotating in opposing directions. To assure the uninterrupted transport of the support particles to the press-rolls 13a, 13b, a water impermeable conveyor belt is provided for the upper press-roll 13b, said conveyor belt extending before the press-rolls 13a, 13b at an acute angle with respect to the lower perforated conveyor belt 12b. Laterally to the conveyor belts and press-rolls, a plurality of guide plates 16 are arranged.

By the opposing movement of the press-rolls 13a and 13b and the roll pressure, generated by means of springs or the like, the support particles are generally compressed to 5 to 30% of their original volume and the adhering solids, bacteria, and liquids squeezed out. The regenerated support particles are then transported, by the conveyor belt 12b passing between the press-rolls 13a and 13b, back to the filter zone 6. If support particles are present in the treatment zone 4, part of the regenerated support particles may be drawn off and passed to the inlet 2 of the activating basin 1. The solids, bacteria and liquids squeezed from the support particles are gathered in a collector vessel 14 arranged under the two press-rolls 13a and 13b, for which reason the lower press-roll 13a is preferably also perforated. The diameter of the holes of the lower press-roll 13a, and also the hole diameter of the conveyor belt 12b, are selected so as to permit the water loaded with solids and bacteria to fall through while retaining the support particles. For example, pores of a hole diameter of 0.2 to 10 mm are used for supports of an uncompressed diameter of about 0.5 to 50 mm. The specific hole diameter will depend on the particle size of the supports and the degree of compression. The number of holes is advantageously 1–10, particularly 5–10 per square centimeter. A sludge discharge line 15 is connected from the collector vessel 14 downstream, for example, with a thickener for the further processing of the sludge.

To loosen the support particles in the packed filter zone 6 to release occluded solids and biomass, it is possible to introduce gas at a higher rate for short periods of time through the aeration spargers 8 to the filter zone 6 above. Under certain conditions such an increased introduction of gas may also be sufficient for the regeneration of the support particles, so that no special regenerating device is required. Instead, in such a case it would be necessary to provide the activation basin, at least in the vicinity of the bottom of the filter zone, with a screen or grating through which the biomass and the solids separated from the support particles during the churning of the said particles as the result of the stronger aeration may be discharged. Furthermore, the filter zone would have to be separated by a conventional overflow weir from the treating zone, in order to prevent the emptying of the treatment zone. Such a regeneration with an increased introduction of gas alone for regeneration is possible if the waste water to be treated has BOD-contents less than 50 mg/l and COD-contents less than 150 ml/l. For instance such a waste water exist in the secondary treatment of waste water for nitrification.

Figure 3:
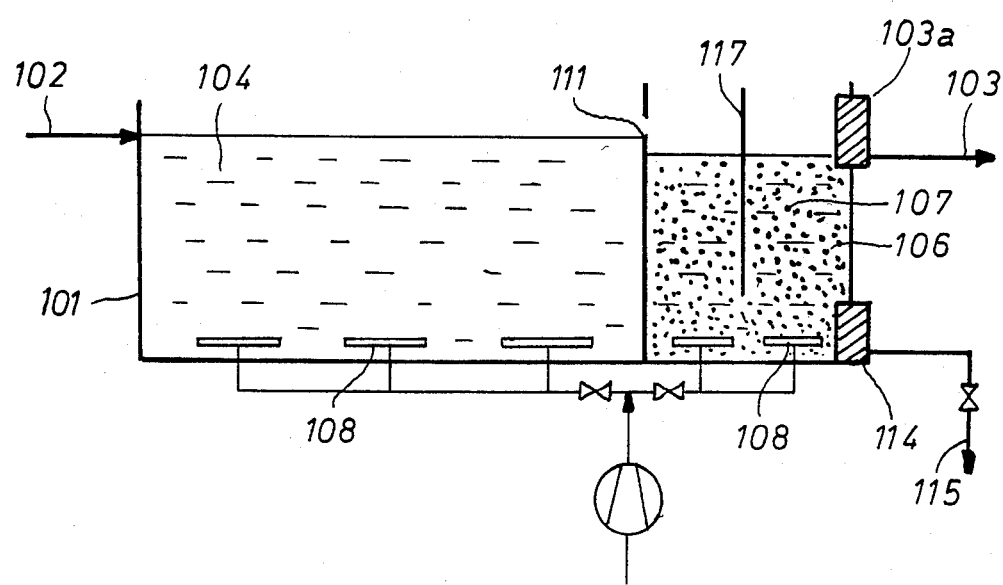
FIG. 3 is a schematic illustration of a preferred embodiment similar to FIG. 1 for the secondary treatment of wastewater.

A suitable installation for this purpose is shown in FIG. 3. The inlet 102 of the activation basin 101 connects this with a first treatment stage (not shown) in which the major proportion of the organic pollutants is decomposed. The activation basin 101 is divided by a wall 105 in a treatment zone 104 in which the decomposition of the residual organic pollutants is conducted in conjunction with nitrification and in a filter zone 106 in which porous support particles 107 are present as the filter medium for solids and biomass. In connection with the filter zone 106 an outlet 103 is arranged at the upper edge of the basin 101 for treated waste water. To prevent the decanting of the support particles through this discharge outlet 103, a screen or grating 103a having openings of a diameter less than the support particles is provided in the outlet 103. Both zones, the treatment zone 104 and the filter zone 106, are provided with aeration devices 108. At the upper end of the wall 105 a conventional overflow weir 111 regulates the flow from the treatment zone 104 to the filter zone 106. To prevent a direct liquid flow from the overflow weir 111 to the discharge outlet 103 a baffle 117 is arranged in the middle of the filter zone 106. For the regeneration of the support particles 107 the introduction of gas through the aeration device 108 of the filter zone 106 which under normal conditions is at most such that insufficient turbulence occurs to disrupt the filter bed built by the support particles is increased for a short period of time so that the support particles are churned in order to release occluded solids and biomass. For the discharge of the separated solids and biomass after the increased aeration a sludge discharge line 115 arranged at least in the vicinity of the bottom of the filter zone 106 and provided with a screen 114 preventing the support particles to be drained is opened. After the liquid containing the released solids and biomass is leaked the discharge line 115 is closed and a new filtering step beginning with the filling of the filter zone 106 with liquid overflowing through weir 111 from the treatment zone 104 takes place. The measurement of the filter zone, the velocity of the liquid flow through the filter zone and the type of support particles in this embodiment can be the same as in the embodiment of FIG. 1.

Figure 2:
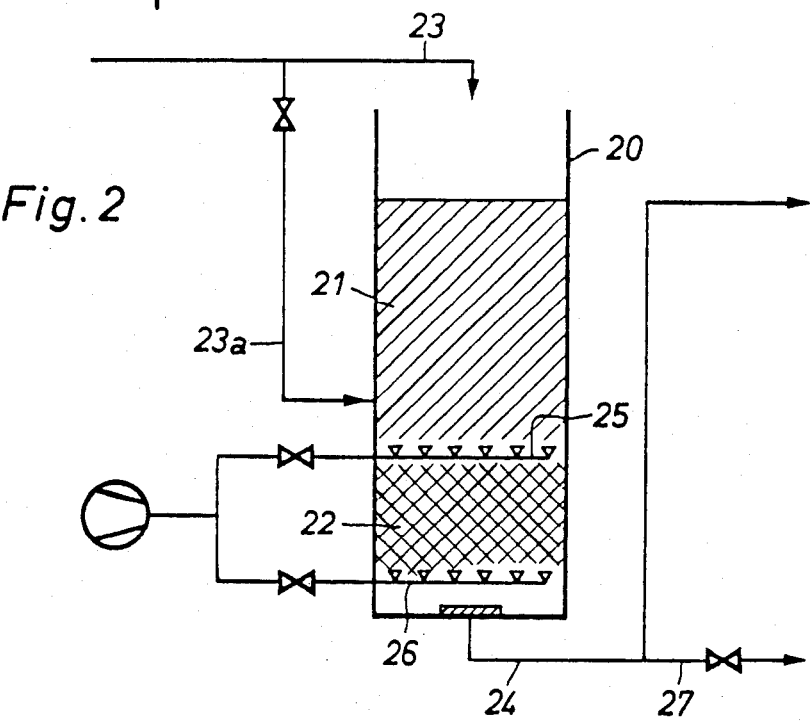
FIG. 2 is a schematic illustration of a preferred embodiment comprising a column reactor with an integrated filter zone.

FIG. 2 shows a column reactor 20 with an integrated filter zone 22, operating without a separate regenerating device. In this case, the liquid to be treated flows from top to bottom through the column reactor 20. For this purpose, there are provided a wastewater inlet 23 at the top and an outlet 24 for the treated liquid at the bottom. The filter zone 22, filled to 40 to 80%, preferably 60 to 70%, with support particles, is placed in the bottom area of the column reactor 20, while the treatment zone 21, filled to 20 to 60%, preferably 40 to 50%, with support particles, is located above it. An aeration installation 25 and 26 is provided for both the treatment zone 21 and the filter zone 22, with the supply of gas to the aeration installations being variable by means of control valves. As a rule, the filter zone 22 is aerated slightly or not at all, while the treatment zone 21 is aerated strongly, in keeping with the consumption of $O_2$. To regenerate the loaded support particles, the outlet 24 of the column reactor 20 is closed and the concentration of particles is diluted by the accumulation of liquid. Simultaneously, the supply of gas to the aeration installations 25, 26 is increased. The subsequent churning of the support particles separates the adhering solids and biomass. After a certain regeneration period, e.g., 3 to 30 minutes, the outlet 24 is opened so that the separated substances may be discharged. To prevent the discharged substances from affecting the quality of the effluent outlet from the column reactor 20, a branch line 27 with an on-off valve is associated with the outlet 24, through which the substances discharged are conducted to the preliminary settling tank or to a thickener. Following the rinsing of the column reactor 20, the branch line 27 is closed and the purified wastewater leaving the column reactor 20 is returned to the normal outlet.

To allow for the occurrence of denitrification processes in the filter zone even without the supply of gas, a branch line 23a is associated with the inlet 23, said branch line 23a opening directly above the filter zone into the column reactor 20.

In addition to the configuration of a column reactor without a regenerating installation, it is obviously also possible to equip a column reactor in keeping with the layout shown in FIG. 1 for an activation basin with a corresponding regenerating installation.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Specific example in connection with the embodiment of FIG. 1.

(1) Waste water inlet
 $BOD_5$ = 150 mg/l
 COD = 260 mg/l

-continued

| | |
|---|---|
| suspended solids | = 80 mg/l |
| waste water feed rate | = 250 m³/h |
| (2) purified waste water | |
| $BOD_5$ | ≦20 mg/l |
| COD | ≦75 mg/l |
| solids | ≦0,2 mg/l |
| (3) treatment zone | |
| $BOD_5$-volume load $B_R$ | = 2 kg/m³ day |
| $BOD_5$-sludge loading $B_{TS}$ | 0,38 kg/kg · day |
| volume | 450 m³ |
| volume of support particles | 30 Vol % |
| specific gravity of the support particles | 60 kg/m³ |
| size of the support particles | 12 × 12 × 12 mm |
| biomass in support particles | 15 kg/m³ |
| biomass not fixed at support particles | about 1 kg/m³ |
| (4) filter zone | |
| volume | 126 m³ = 28% of the treatment zone |
| volume of support particles | 60 Vol % |
| velocity of the liquid | 6 m/h |
| storage capacity of solids | 700 kg |
| passage of solids to filter zone | 150 mg/l |
| running time of the filter | 18 h |
| (5) regeneration | |
| quality of support particles being transported to regeneration unit | 7m³/h |
| quantity of support particles and water being transported to the press rolls | 10–20 m³/h |
| intensity of pressing | 75% |
| solids content of regenerated sewage | 30–50 kg/m³ |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. In a process for the biological purification of wastewater, comprising treating wastewater in a treatment zone in a reactor in the presence of activated sludge and separating the resultant mixture of treated wastewater and activated sludge into purified water and activated sludge, the improvement comprising:
passing said mixture after the treatment zone through a filter zone, arranged within the same reactor as that of the treatment zone, and containing a bed of support particles in an amount equal to about 40 to 80% of the volume of the filter zone, said particles being flexible, open cell, porous organic polymers, to deposit resultant biomass onto the support particles, with said passing through said filter zone being conducted in a manner such that the degree of turbulence generated is insufficient to disrupt the bed of support particles in the filter zone, said filter zone being aerated during filtering with insufficient turbulence to disrupt the filter bed, and the passing of the mixture comprising flowing the mixture of wastewater and activated sludge upwardly in the filter zone;
transporting the support particles from the bottom area of the filter zone into an area above the filter bed for regeneration, regenerating the resultant loaded support particles and withdrawing biomass separated from the support particles during the regeneration;
withdrawing from said filter zone in a stream resultant purified wastewater; and
passing resultant regenerated support particles free of the biomass downwardly to the filter zone.

2. A process according to claim 1, wherein the treatment zone of the reactor is a fully mixed activation basin.

3. A process according to claim 2, wherein the activation basin contains support particles for the growth of biomass.

4. A process according to claim 2, wherein the proportion by volume of the support particles in the treatment zone is adjusted to 20–40%.

5. A process according to claim 1, wherein said regeneration is conducted by compressing the loaded particles with at least two cooperating rotating press rolls arranged one on top of the other, the lower press-roll having holes for passing squeezed out biomass therethrough, and collecting the squeezed out biomass in a collector vessel disposed below the lower press-roll and discharging it therefrom.

6. In a process for the biological purification of wastewater, comprising treating wastewater in a treatment zone in a reactor in the presence of activated sludge and separating the resultant mixture of treated wastewater and activated sludge into purified water and activated sludge, the improvement comprising:
passing said mixture after the treatment zone through a filter zone, arranged within the same reactor as that of the treatment zone, and containing a bed of support particles in an amount equal to about 40 to 80% of the volume of the filter zone, said particles being flexible, open cell, porous organic polymers, to deposit resultant biomass onto the support particles, with said passing through said filter zone being conducted in a manner such that the degree of turbulence generated is insufficient to disrupt the bed of support particles in the filter zone, said filter zone being aerated during filtering with insufficient turbulence to disrupt the filter bed;
regenerating resultant loaded support particles within the filter zone by periodically vigorously aerating the filter zone; and
withdrawing from said filter zone in separate streams resultant purified wastewater and biomass separated from the support particles during the regeneration.

7. A process according to claim 6, wherein biomass removed from the support particles during vigorous aeration is removed from the filter zone by the inflow of said mixture of wastewater and activated sludge.

8. A process according to claim 6, wherein biomass removed from the support particles during vigorous aeration is removed from the filter zone by at least partial rapid emptying of the filter zone.

9. A process according to claim 6, wherein the treatment zone of the reactor is a fully mixed activation basin.

10. A process according to claim 9, wherein the activation basin contains support particles for the growth of biomass.

11. A process according to claim 9, wherein the proportion by volume of the support particles in the activation basin is about 20–40%.

12. A process according to claim 6, wherein biomass removed from the support particles during vigorous aeration is removed from the filter zone by at least partial rapid emptying of the filter zone.

13. An apparatus for conducting a wastewater treatment process comprising a reactor (1, 101) comprising a treatment zone (4, 104) having inlet means (2, 102), and connected to a filter zone (6, 106) for treating wastewater in the treatment zone and feeding treated wastewater to the filter zone, said filter zone containing support particles of flexible, open cell, porous organic polymers therein in an amount equal to about 40 to 80% of the volume of the filter zone, for having biomass deposited thereon when treated wastewater from the treatment zone is passed therethrough, aerating means in said filter zone constructed for generating insufficient turbulence, in the filter zone when in use, to disrupt the bed of support particles therein, and said filter zone being constructed such that treated wastewater being fed thereto flows in a direction upwardly in the filter zone and the support particles flow downwardly in a generally countercurrent flow to the treated wastewater flow, regenerating means including withdrawing means for withdrawing loaded support particles from a location at the bottom of the filter zone and transporting them into an area above the filter zone for regenerating the support particles, and discharging means for separated biomass and returning the thus-regenerated support particles to a location at the top of the filter zone, and purified wastewater discharge means for discharging a purified wastewater stream from said filter zone.

14. An apparatus according to claim 13, said treatment zone (4) being in the form of an activation basin (1) and support particles for the biomass being present in the activation basin.

15. An apparatus according to claim 13, wherein said regenerating means (1) for the support particles comprises an upwardly movable conveying means (11) connected with the filter zone (6) being in communication with said conveying means, drainage means (12), compression means (13) and a collector vessel (14) for the liberated biomass, said compression means being arranged above the filter zone and being in communication with said drainage means.

16. An apparatus according to claim 15, said compression means comprising at least two rotating press-rolls (13a, 13b), a lower press-roll (13a) being provided with holes for the passage of squeezed out biomass, said collector vessel (14) being disposed below the lower press-roll (13a) to collect said squeezed out biomass.

17. An apparatus for conducting a wastewater treatment process comprising a reactor (1, 104) comprising a treatment zone (4, 104) having inlet means (2, 102), and connected to a filter zone (6, 106) for treating wastewater in the treatment zone and feeding treated wastewater to the filter zone, said filter zone containing support particles of flexible, open cell, porous organic polymers therein in an amount equal to about 40 to 80% of the volume of the filter zone, for having biomass deposited thereon when treated wastewater from the treatment zone is passed therethrough, aerating means in said filter zone constructed for generating insufficient turbulence, in the filter zone when in use during filtering, to disrupt the bed of support therein, regenerating means (108) for regenerating the support particles in the filter zone, said regenerating means comprising said aerating means being constructed for vigorously aerating, on a periodic basis, the support particles in the filter zone with discharge means provided at the bottom of the filter zone for discharging biomass separated from regenerated support particles from the filter zone, and purified wastewater discharge means for discharging a purified wastewater stream from said filter zone.

18. An apparatus according to claim 17, wherein said filter zone is a zone in the reactor separated from the treatment zone by a wall having an overflow weir regulating flow from the treatment zone to the filter zone, and a baffle arranged in the middle of the filter zone for preventing flow from the weir from being directly discharged from the filter zone.

* * * * *